(12) United States Patent
Cavanagh et al.

(10) Patent No.: US 8,225,602 B2
(45) Date of Patent: Jul. 24, 2012

(54) INTEGRATED PUMP AND INJECTOR FOR EXHAUST AFTER TREATMENT

(75) Inventors: Mark S. Cavanagh, West Granby, CT (US); Robert G. Lucas, Ellington, CT (US); Yevgeniy Norkin, Longmeadow, MA (US)

(73) Assignee: Stanadyne Corporation, Windsor, CT (US)

( * ) Notice: Subject to any disclaimer, the term of this patent is extended or adjusted under 35 U.S.C. 154(b) by 423 days.

(21) Appl. No.: 12/456,060

(22) Filed: Jun. 11, 2009

(65) Prior Publication Data

US 2010/0313553 A1 Dec. 16, 2010

(51) Int. Cl.
*F01N 3/00* (2006.01)
(52) U.S. Cl. ............................................. 60/295; 60/301
(58) Field of Classification Search .................... 60/286, 60/295, 301; 417/416, 417
See application file for complete search history.

(56) References Cited

U.S. PATENT DOCUMENTS

| | | | |
|---|---|---|---|
| 3,995,356 A | 12/1976 | Sheppard | |
| 4,520,962 A | 6/1985 | Momono et al. | |
| 4,811,715 A | 3/1989 | Djordjevic et al. | |
| 5,484,108 A | 1/1996 | Nally | |
| 5,800,130 A * | 9/1998 | Blass et al. | 417/213 |
| 5,976,475 A | 11/1999 | Peter-Hoblyn et al. | |
| 6,382,600 B1 | 5/2002 | Mahr | |
| 6,516,607 B1 * | 2/2003 | Bruck et al. | 60/274 |
| 6,572,028 B1 | 6/2003 | Fly et al. | |
| 6,823,833 B2 | 11/2004 | Ismailov | |
| 6,824,085 B2 | 11/2004 | Sebastian et al. | |
| 6,851,629 B2 | 2/2005 | Stier et al. | |
| 7,467,749 B2 | 12/2008 | Tarabulski et al. | |
| 2004/0103641 A1* | 6/2004 | Maisch | 60/272 |
| 2004/0191093 A1* | 9/2004 | Weigl | 417/413.1 |
| 2005/0235632 A1 | 10/2005 | Tarabulski et al. | |
| 2006/0029503 A1 | 2/2006 | Takehana | |
| 2007/0074504 A1* | 4/2007 | Driscoll et al. | 60/285 |
| 2007/0200007 A1* | 8/2007 | Stevens et al. | 239/7 |
| 2007/0228191 A1* | 10/2007 | Harmon et al. | 239/533.2 |
| 2008/0011777 A1 | 1/2008 | Cooke | |
| 2008/0014103 A1* | 1/2008 | Cooke | 417/410.1 |
| 2008/0087739 A1* | 4/2008 | Tarabulski et al. | 239/11 |
| 2008/0092527 A1 | 4/2008 | Ripper et al. | |
| 2008/0224805 A1 | 9/2008 | Becker et al. | |
| 2009/0019835 A1* | 1/2009 | Dingle | 60/282 |

FOREIGN PATENT DOCUMENTS

WO WO2005005799 A1 1/2005
WO WO2007124873 A1 11/2007

* cited by examiner

*Primary Examiner* — Thomas Denion
*Assistant Examiner* — Patrick Maines
(74) *Attorney, Agent, or Firm* — Alix, Yale & Ristas, LLP

(57) ABSTRACT

A urea solution injection system and an injector with which urea solution or other exhaust treatment liquid from a source tank can be injected as an atomized spray into an exhaust pipe. A metering pump with integrated injection nozzle are contained in a common housing mounted directly to the exhaust pipe, thereby eliminating the separate electric motor driven pump, line between pump, and injector in conventional systems.

13 Claims, 11 Drawing Sheets

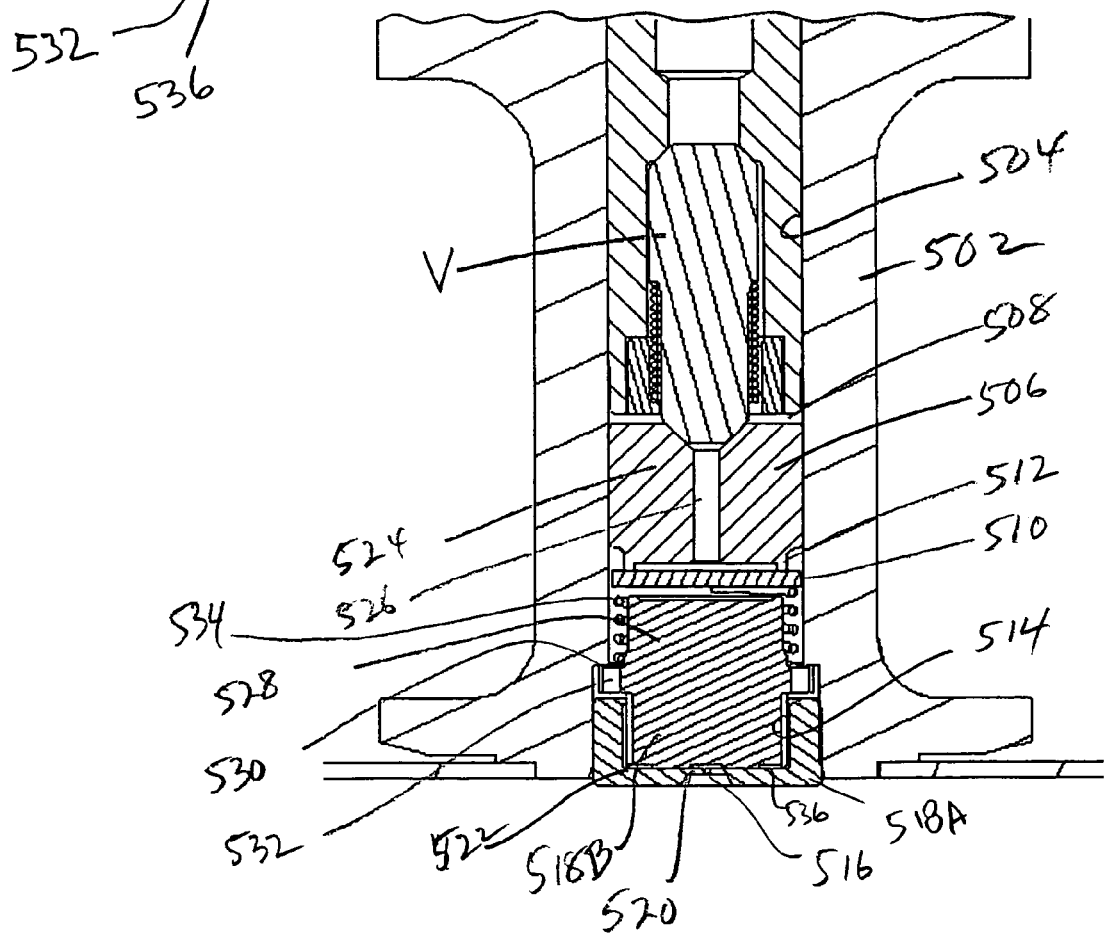

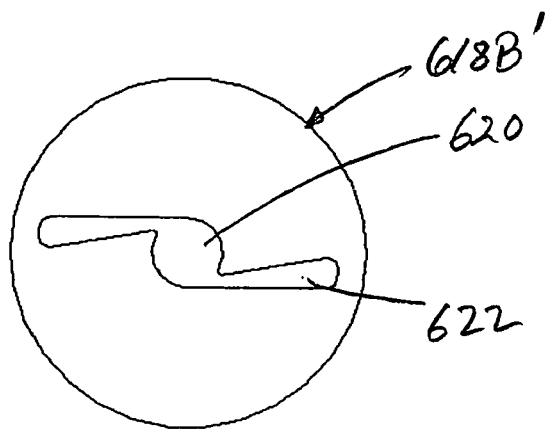
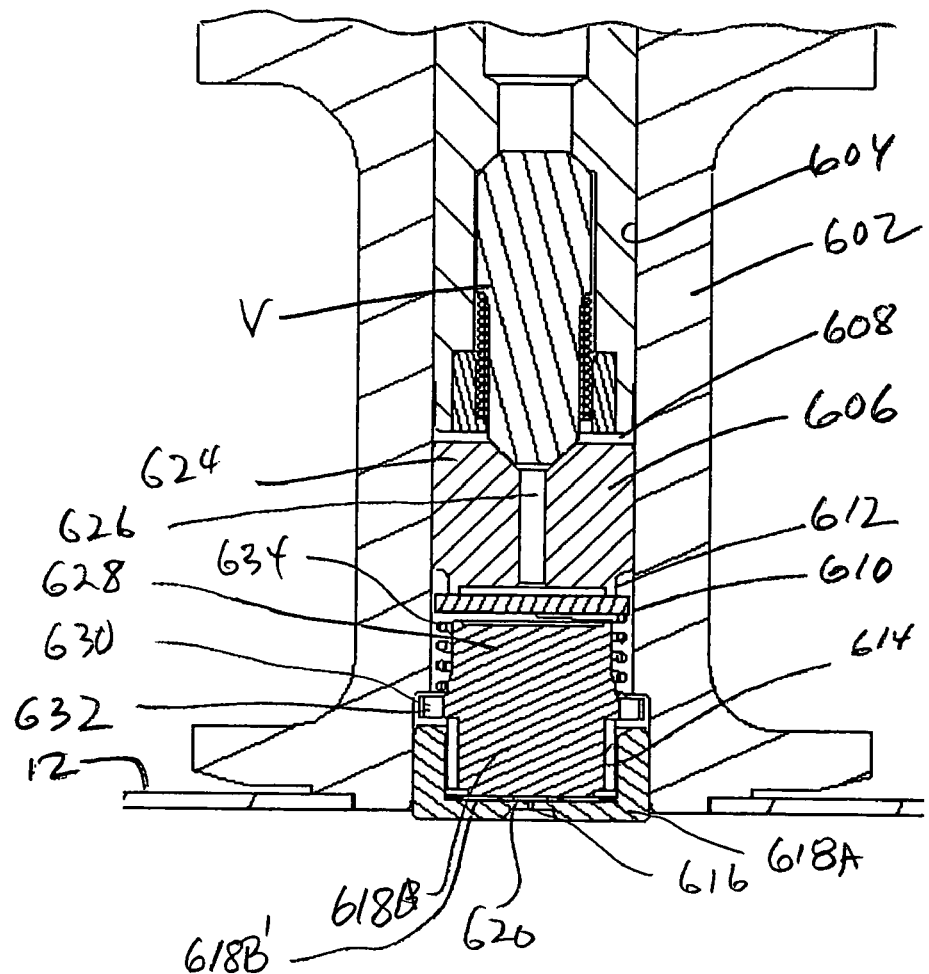

INTEGRATED PUMP AND INJECTOR FOR EXHAUST AFTER TREATMENT

BACKGROUND

Emissions standards for vehicles with internal combustion engines continue to become more stringent. For both on and off highway vehicles with diesel engines, a common exhaust after treatment to reduce NOx emissions is the use of a Selective Catalytic Converter (SCR) in the exhaust pipe. The desired chemical reactions in the SCR are enhanced by the injection of a urea solution into the exhaust pipe, upstream of the SCR device.

Typically, a particulate trap or similar filter device is also situated in the exhaust pipe. Such devices must be periodically regenerated, and a common approach is to inject a hydrocarbon liquid into the exhaust stream, which combusts and thereby produces sufficient heat to regenerate the device.

It is desirable that a similar injector be provided for use with both the SCR device and the filter device.

There are currently two known types of SCR urea systems being utilized.

One system includes an air pump, a urea solution storage tank, a low pressure metering pump controlled by an electronic control unit, a nozzle that feeds into the air line, and a catalyst located in the engine exhaust. The air line feeds the mix of air and urea solution into the exhaust upstream of the catalyst. Quantity control is determined via operating frequency of the metering pump.

A newer, airless system includes a urea solution storage tank, a motor driven pump that pressurizes the urea solution through a line, and into a magnetically actuated injector controlled by an electronic control unit. The injector feeds an atomized urea solution plume into the exhaust upstream of a catalyst. Quantity control is determined via operating frequency and duration of the injector.

It is well known in the industry that all SCR urea systems add significant cost and complexity to any vehicle platform.

SUMMARY

The current invention is an airless system with a new approach. The primary purpose of the invention is to simplify and reduce costs compared to known SCR and hydrocarbon dosing systems. It is another objective of the invention to maintain very good atomization during the injection event. This is accomplished by incorporating a metering pump with integrated injection nozzle mounted directly to the exhaust, thereby eliminating the separate electric motor driven pump, line between pump, and injector. The integrated pump and injector can be considered a type of "integrated pump injector". Such integrated pump injector has many benefits.

System cost is reduced because the pump, line, and injection nozzle are incorporated into one unit, mounted directly to the exhaust pipe. This eliminates a separate pump, motor, section of heated fluid line and connections, motor electrical connections and driver and controls.

System complexity and assembly time and cost are reduced because there are less fluid connections and components to secure.

Good atomization is achievable because the pressurized fluid volume is very small. The low volume steepens the pressure rise and fall rates, which minimizes the quantity injected at low pressure where atomization is poor.

Electric power consumption is significantly reduced. Due to the relatively small orifice in the nozzle, pumping duration is significantly longer than charging duration. Embodiments of the present invention utilize a spring to perform the pumping event, energized for the charging cycle, thus minimizing power consumption. In prior systems, a separate motor driven pump must be powered, and a solenoid actuated injector must be energized during the entire injection event.

The salient features of the invention can be viewed from several perspectives.

From one perspective, the present disclosure is directed to an after treatment unitized pump with integral injection nozzle, that includes a magnetically actuated pumping piston, an inlet check assembly, an outlet check assembly, and an injection nozzle housed in a common mounting structure for injecting urea solution or hydrocarbons into the exhaust stream of a diesel engine. The advantage is that a pump, a connection line, and an injector are combined into a single mountable unit with low system cost and complexity.

The integrated pump injector is powered in the charging cycle, and the pumping piston is spring energized to generate pumping and injection pressures. The advantage of this mode of operation is reduced power consumption because the charging cycle is a shorter time interval than the pumping cycle.

The integrated pump injector with an outlet check valve that opens and closes at a pressure sufficient for fluid atomization, provides the advantage that rapid beginning and end of injection occurs, minimizing poor atomization during those transitions.

The integrated pump injector with an inlet check valve and injection nozzle located in close proximity and housed in the same unitized assembly provides the advantage that a low pressurized volume is obtained causing rapid beginning and end of injection, thus minimizing poor atomization during those transitions.

The integrated pump injector with an inlet check-valve and outlet check valve located in close proximity and housed in the same unitized assembly can have an outlet check valve that opens at a pressure less than one bar gage. The advantage is that air purge is possible into the exhaust because the pump's compressed volume is adequate to compress the air enough to open the outlet check valve.

The integrated pump injector can have an inlet check valve that is forcibly opened near the end of the pumping event to purge air from the pumping chamber, as well as improve pressure decay time and atomization.

Preferably, the piston is solenoid operated in the charging cycle, and spring powered in the pumping cycle to generate pumping/injection pressures. The pumping/injection event can be interrupted by re-energizing the solenoid before full piston travel is obtained, thereby obtaining smaller minimum delivered quantities and improving the end of injection atomization by further sharpening the pressure decay rate.

BRIEF DESCRIPTION OF THE DRAWING

Embodiments of the invention will be described with reference to the accompanying drawing, in which:

FIGS. 10 and 11 are section and bottom views, respectively, of yet another embodiment; and FIGS. 12 and 13 are section and bottom views of a final embodiment.

DETAILED DESCRIPTION

Figure 1:
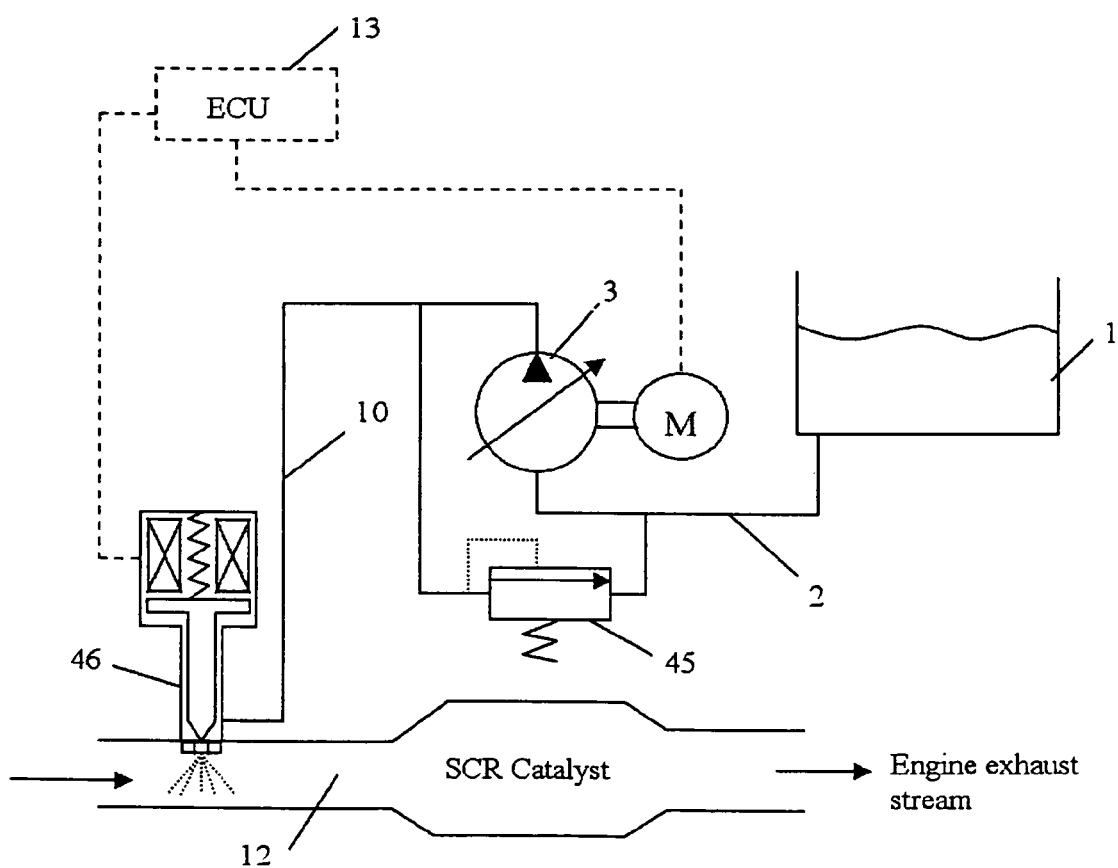
FIG. 1 is schematic representing one type of known urea injection system.

FIG. 1 is a schematic representing the prior art airless system summarized in the Background.

Urea solution is stored in a holding tank 1, and travels through line 2, where it enters the pump 3. Pump 3 is driven by an electric motor. The electric motor is driven and controlled by electronic control unit (ECU) 13 to deliver adequate volume through line 10 and into injector 46. A substantially constant pressure is maintained in the line 10 and injector 46 by regulator 45 which is either a separate component, or integrated within pump 3. Injector 46 is solenoid operated and controlled and powered by ECU 13. The injector delivers atomized urea solution into the engine exhaust pipe 12 where it can react with the SCR catalyst. Injected quantity control is determined by operating frequency and duration of the injector opening. Tank 1 and lines 2 and 10 are heated to avoid freezing of the urea solution in cold climates.

Figure 2:
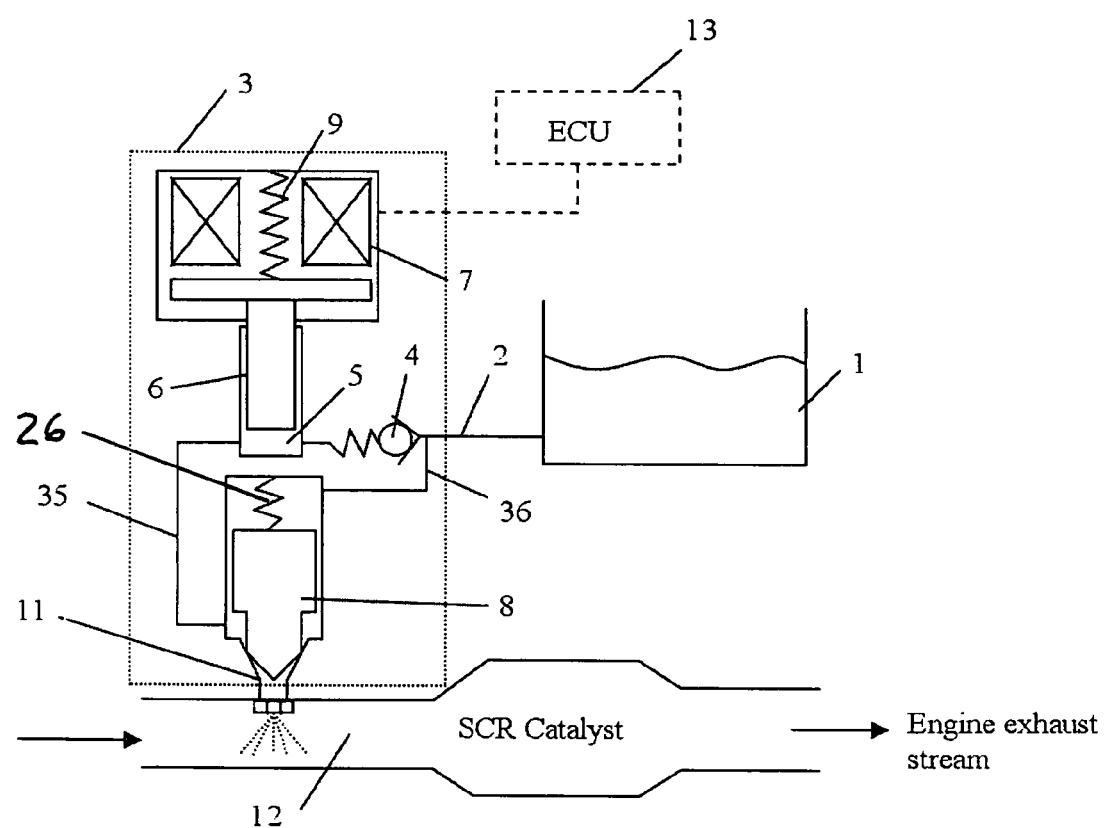
FIG. 2 is a schematic of a first embodiment of a urea injection system including a integrated pump injector according to an aspect of the present invention.

FIG. 2 is a schematic of one embodiment according to an aspect of the present invention. Urea solution is stored in a holding tank 1, and travels through line 2, where it enters the integrated pump injector 3. The integrated pump injector is bounded by housing and contains an inlet check 4 in fluid connection with line 2. It should be appreciated that the term "housing" as used herein refers to the boundary of a collection of cooperating components that are connected together within a cover or joined covers such that the housing can be handled and mounted on the exhaust pipe as a single device.

Fluid enters the pumping chamber 5 during a retraction stroke of the piston 6, when solenoid 7 is energized by ECU 13. When solenoid 7 is de-energized, spring 9 applies a load to piston 6, displacing the piston downward. The fluid in pumping chamber 5 is compressed, which pressurizes the pumping chamber 5, passage 35, and an annulus around the lower portion of outlet check valve 8. The annulus is defined by the difference between the OD sealing diameter and the sealing seat. The outlet check valve 8 opens when sufficient pressure is reached to overcome the set pressure of the spring 26. The fluid then mixes with fluid in the nozzle 11 where it builds pressure and delivers atomized urea solution into the engine exhaust pipe 12 where it can react with the SCR catalyst. Passage 36 allows venting of the displaced volume in the outlet check valve spring chamber. The piston 6 delivers a full pumping stroke of urea solution during each cycle. Mass flow control is determined by the operating frequency. Tank 1 and line 2 are heated to prevent freezing of the urea solution in cold climates.

Figure 3:
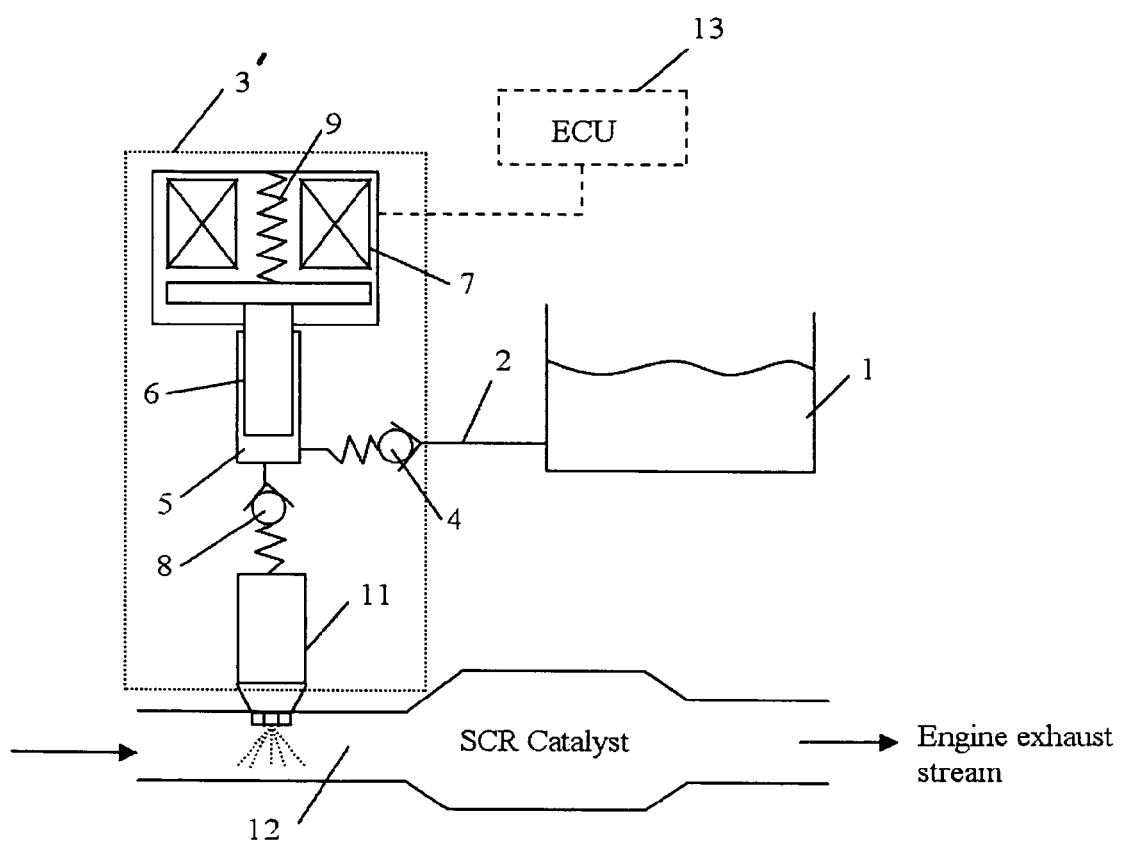
FIG. 3 is a schematic of a second embodiment of a system according to an aspect of the present invention.

FIG. 3 is a schematic of another system embodiment according to an aspect of the present invention. Urea solution is stored in a holding tank 1, which can be at ambient pressure, and travels through line 2, where it enters the integrated pump injector 3'. The integrated pump injector contains an inlet check 4 in fluid connection with line 2.

Fluid enters the pumping chamber 5 as a feed charge during a retraction or intake stroke of the piston 6, when solenoid 7 is energized by ECU 13 and the retraction lowers the pressure in the pumping chamber below ambient. When solenoid 7 is de-energized, spring 9 applies a load to piston 6, displacing the piston downward into the pumping or discharge stroke. The fluid in pumping chamber 5 is compressed thereby opening outlet check valve 8. The fluid then mixes with fluid in the nozzle 11 where it builds pressure and delivers atomized urea solution into the engine exhaust pipe 12 where it can react with the SCR catalyst. The piston 6 delivers a full pumping quantity commensurate with the maximum volume of the pumping chamber solution during each stroke cycle. Mass flow (quantity) control is determined by the operating frequency (cycling rate) of the integrated pump injector 3.

Figure 4:
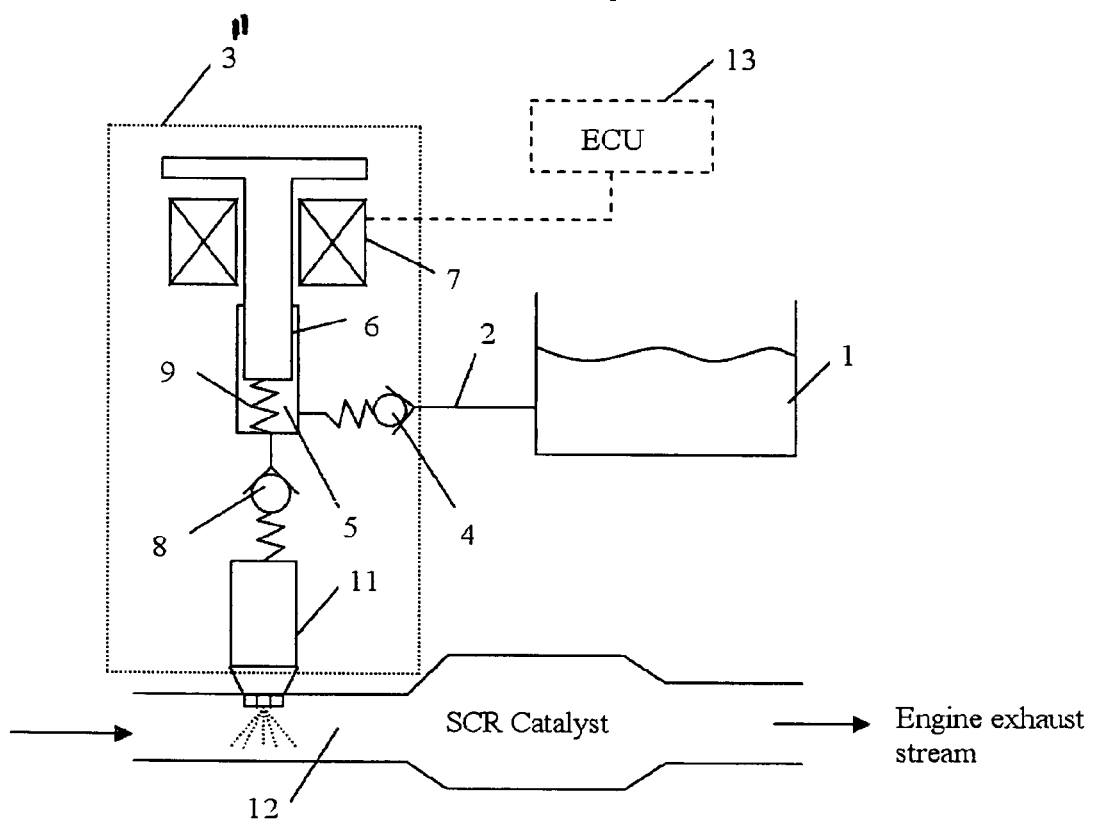
FIG. 4 is schematic of a third embodiment of a system according to an aspect of the present invention.

FIG. 4 is a schematic of an alternate embodiment 3" of the present invention. The only difference compared to FIG. 3 is that the solenoid 7 is energized to compress the fluid to perform the pumping and injection events, and spring 9 is used to perform the retraction stroke of piston 6. This same operating principle can be applied to the schematic of FIG. 3.

In the embodiment of FIGS. 2 and 3, the maximum pressure is determined by the plunger spring force divided by the piston cross-sectional area, whereas in the embodiment of FIG. 4 the maximum pressure is determined by (solenoid force—spring force) divided by piston cross-sectional area.

FIGS. 2, 3, and 4 all show embodiments that eliminate the high cost of adding the electric motor driven pump, regulator, additional fittings, additional heated line, and electric motor drive circuit, in such a system as described in FIG. 1.

Figure 5:
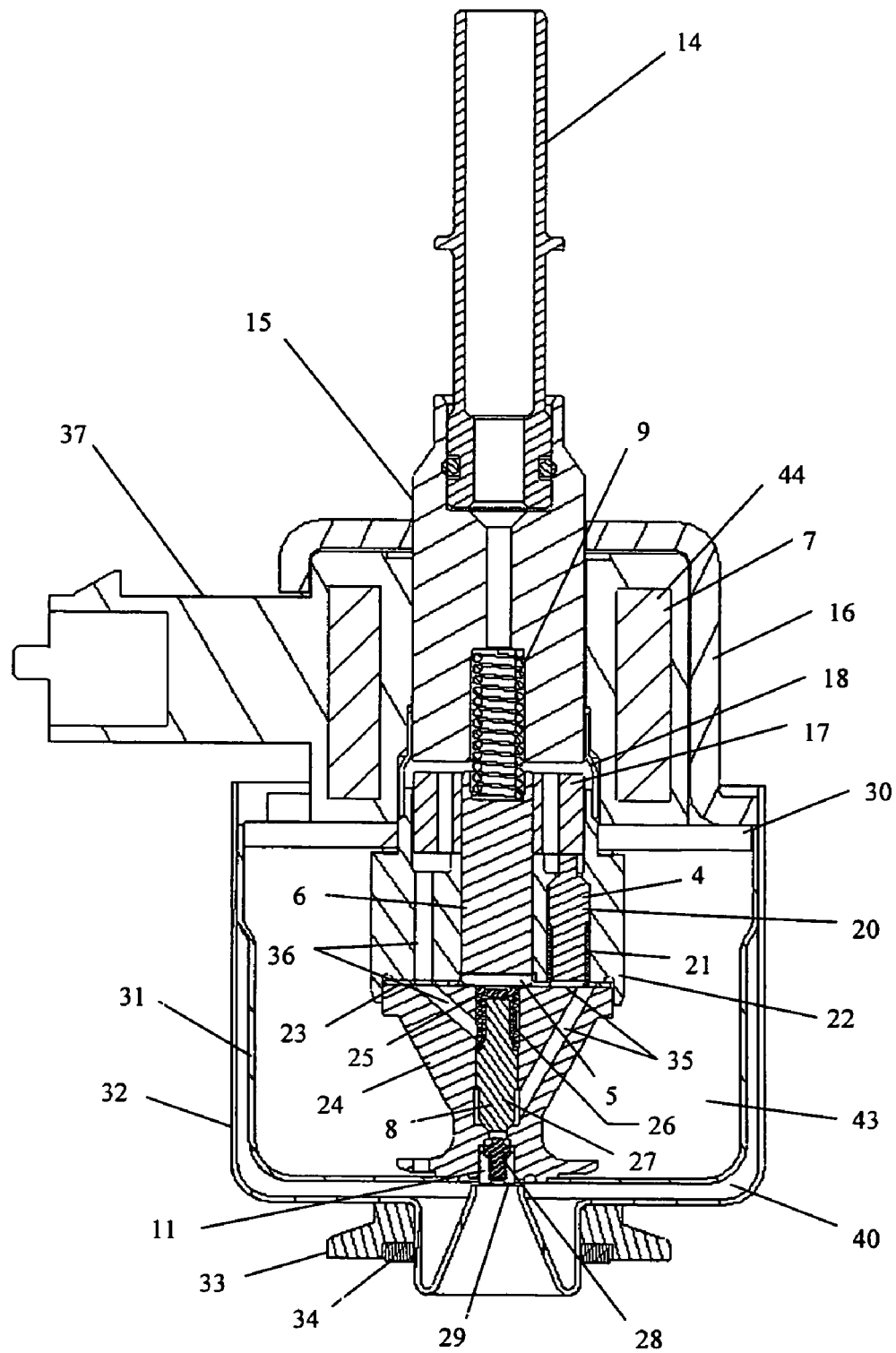
FIG. 5 is a sectional view of the integrated pump injector of FIG. 2.

FIG. 5 is a cross-section of the embodiment of the integrated pump injector 3 shown in FIG. 2.

Solenoid 7 is made up of several components which make up the magnetic circuit. These components include coil 44, frame 16, plate 30, a portion of piston sleeve 22, armature 17, and pole piece 15. Component 37 is a plastic over molded component with a molded in connector for electrical connection to the ECU controlled power source. Item 18 is a magnetic break component and is affixed to items 15 and 22 by welding or the like. When the solenoid 7 is energized, armature 17, along with piston 6, which is affixed to the armature 17 by press fit or the like, move towards the pole piece 15. Fluid then flows through the inlet fitting 14, pole piece 15, piston spring 9, holes in armature 17, and into the inlet check assembly 4. The inlet check assembly 4 is comprised of a sealing seat machined within piston sleeve 22, valve 20, and spring 21. Fluid then continues to flow into pumping chamber 5 until full stroke of piston 6 is obtained, then the valve 20 closes.

When the solenoid is de-energized, piston spring 9 forcibly moves the piston through the piston sleeve 22 to compress the fluid in pumping chamber 5. The fit between piston 6 and piston sleeve 22 is close enough to minimize fluid leakage. The fluid in pumping chamber 5 is in connection with passages 35 and outlet check valve 27, all of which get pressurized. Piston sleeve 22 is sealed to valve body 24 with gasket 23 and affixed by welding or the like.

Outlet check assembly 8 is comprised of outlet check valve 27, outlet check spring 26, outlet check stop 25, and valve body 24. Outlet check valve 27 opens when sufficient pressure is reached about an area defined by the differential area of the outside diameter of the check valve 27 with close fit to valve body 24 minus the seat diameter at the conical sealing interface between check valve 27 and valve body 24, to overcome the force of outlet check spring 26. Outlet check stop 25 is positioned and sealed to the valve body 24 by welding or the like. When outlet check valve 27 opens, a volume is displaced into the chamber where spring 26 is located. This volume is allowed to vent through passages 36, through holes in the armature 17, and into the low pressure side of the pump. This allows unrestricted opening of outlet check valve 27. Once the outlet check valve 27 opens, the fluid pressurizes within nozzle assembly 11. Nozzle assembly 11 is comprised of a swirl plug 28 and orifice plug 29, which is affixed and sealed to the valve body 24 by press fit or the like. The pressurized fluid then flows around the swirl element or plug 28, out the orifice in orifice plug 29, and is atomized in the exhaust pipe 12.

The piston 6 is allowed to complete its full stroke between upper and lower stop surfaces corresponding to the maximum discharge volume of the pumping chamber for consistent, uniform and thereby accurate quantity control. Just prior to completing its full travel, however, armature 17 contacts the upper portion of inlet check valve 20, thereby opening the inlet check valve allowing rapid pressure decay. This also aids in venting air within the system. Inner can 31 is affixed to valve body 24, plate 30, and outer can 32 by press fits and welds or the like. Mounting flange 33 is affixed to outer can 32 by press fit or welding or the like, and is used to mount the entire assembly to the exhaust pipe. Exhaust gasket 34 is retained over outer can 32 by press-fit or the like, and seals the assembly to the exhaust pipe. A gap 40 is maintained between the inner can 31 and outer can 32 to act as a thermal barrier against overheating of the fluid. An air gap 43 is an added thermal barrier or it can be filled with a low thermally conductive material.

Figure 6:
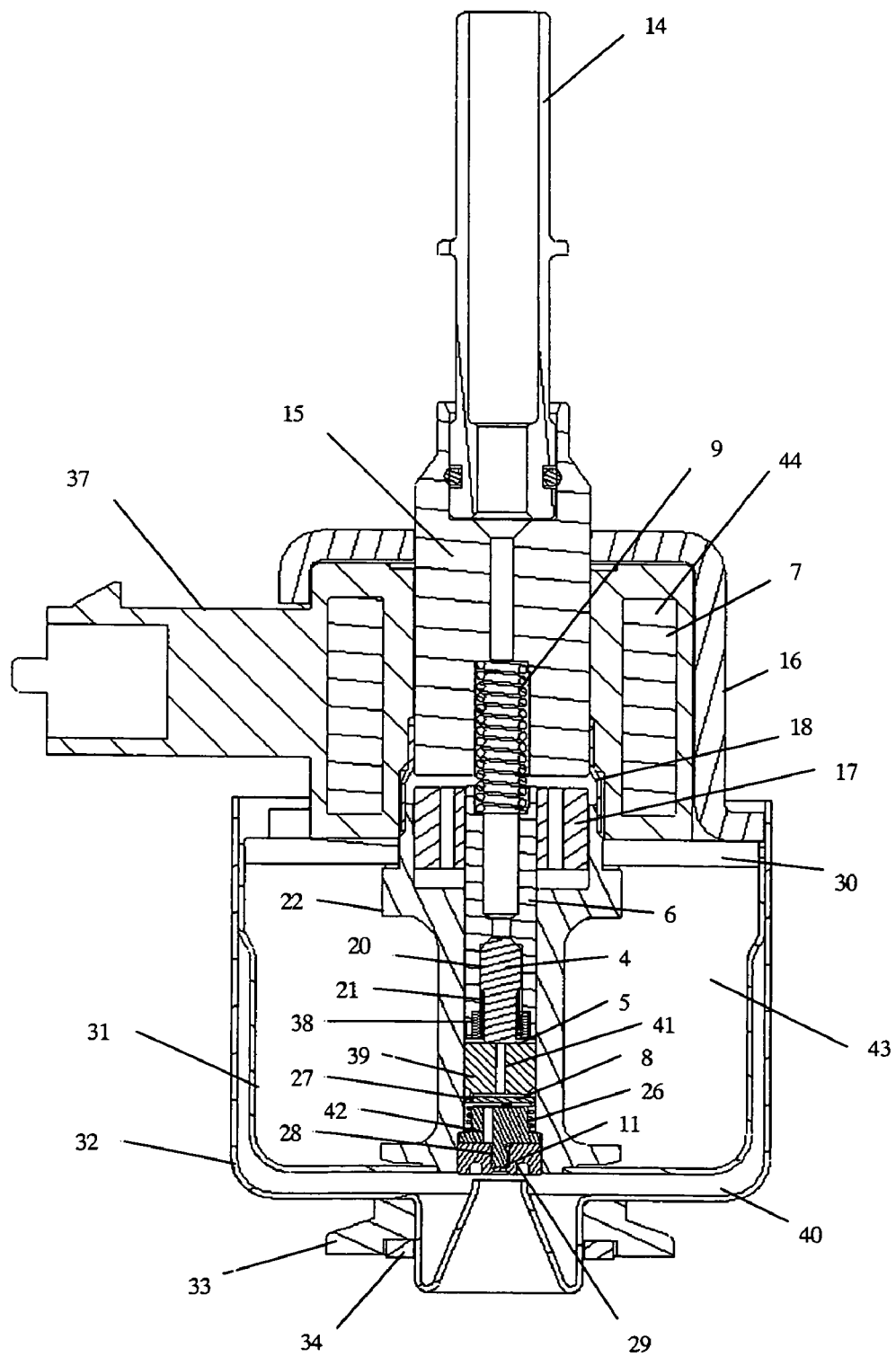
FIG. 6 is a sectional view of the integrated pump injector of FIG. 3.

FIG. 6 is a cross-section of the embodiment of the integrated pump injector 3' as shown in FIG. 3. Solenoid 7 is made up of several components which make up the magnetic circuit. These components include coil 44, frame 16, plate 30, a portion of piston sleeve 22, armature 17, and pole piece 15. Component 37 is a plastic over molded component with a molded in connector for electrical connection to the ECU controlled power source. Item 18 is a magnetic break component and is affixed to items 15 and 22 by welding or the like. When the solenoid 7 is energized, armature 17, along with piston 6 which is affixed to the armature 17 by press fit or the like, moves towards the pole piece 15. Fluid then flows through the inlet fitting 14, pole piece 15, and piston spring 9, and into the inlet check assembly 4. The inlet check assembly 4 is comprised of an inlet check valve 20, a sealing seat machined into piston 6, spring 21, and retainer 38. The retainer 38 is affixed to the piston 6 by welding or the like, and retains the spring 21 and inlet check valve 20. Fluid then continues to flow into pumping chamber 5 until full piston 6 stroke is obtained, then the inlet check valve 20 closes.

When the solenoid is de-energized, piston spring 9 forcibly moves the piston through the piston sleeve 22 to compress the fluid in pumping chamber 5. The fit between piston 6 and piston sleeve 22 is close enough to minimize fluid leakage. The fluid in pumping chamber 5 is in connection with passage 41 and outlet check valve 27, all of which get pressurized.

Outlet check assembly 8 is comprised of outlet check valve 27, outlet check spring 26, outlet check stop 28, and outlet check seat 39. Outlet check seat 39 is sealed and affixed to the piston sleeve 22 by press fit or the like. Outlet check valve 27 opens at a relatively low pressure setting, to minimize pressure drop. Once the outlet check valve 27 opens, the fluid pressurizes within nozzle assembly 11. Nozzle assembly 11 is comprised of the outlet check stop 28 with an integral swirl plug, and orifice plug 29, which is affixed and sealed to the piston sleeve 22 by press fit or the like. The pressurized fluid then flows through the hole 42 in the outlet check stop 28 and its swirl plug, out the orifice in orifice plug 29, and is atomized in the exhaust pipe 12. The piston 6 is allowed to complete its full stroke between upper and lower stop surfaces for accurate quantity control.

Inner can 31 is affixed to piston sleeve 22, plate 30, and outer can 32 by press fits and welds or the like. Mounting flange 33 is affixed to outer can 32 by press fit or welding or the like, and is used to mount the entire assembly to the exhaust pipe. Exhaust gasket 34 is retained over outer can 32 by press-fit or the like, and seals the assembly to the exhaust pipe. A gap 40 is maintained between the inner can 31 and outer can 32 to act as a thermal barrier against overheating of the fluid. An air gap 43 is an added thermal barrier or it can be filled with a low thermally conductive material.

It should be appreciated that the discharge valve can take a variety of forms. The discharge valve nose and seat can be conical as in FIG. 5 or the seat can be cylindrical with a flat disc valve as shown in FIG. 6. When the valve member is lifted, pressurized treatment liquid quickly enters the injection nozzle.

Figure 7:
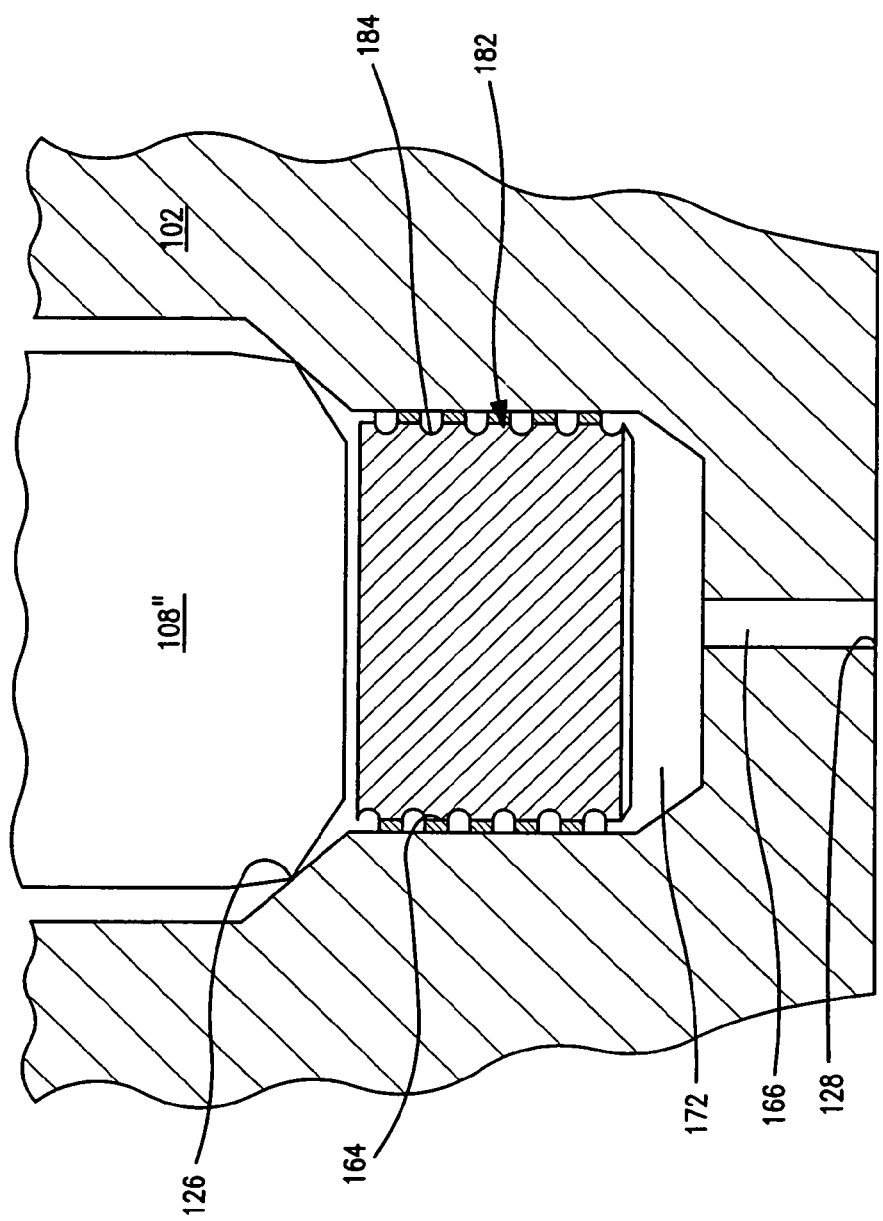
FIG. 7 is detailed view of a swirl element of a type usable with the present invention.

A representative nozzle region is shown in FIG. 7, wherein the nozzle assembly includes means for imparting a swirling flow to treatment liquid entering the nozzle assembly upon the opening of the discharge valve member at the preestablished threshold pressure. The swirling treatment liquid is delivered as an atomized spray into the exhaust flow. The means for imparting a swirling flow can include a first, annular swirl chamber having helical grooves through which the treatment liquid passes, and a second, substantially cylindrical swirl chamber coaxially situated immediately downstream of the first swirl chamber, where the swirling flow is received and maintained before exiting through the orifice. The orifice is in direct coaxial fluid communication with the second swirl chamber.

The swirl element 182 is a solid cylindrical insert with a single or multiple helical groove patterns 184 on the exterior. The outside diameter closely conforms to the smooth internal wall diameter of the chamber, but the insert is an immovable plug. The pressurized liquid must pass through the grooves to be discharged. The valve 108" does not have an integral extension. Alternatively, the internal wall can have the grooves adjacent smooth outside surface of the plug.

Figure 8:
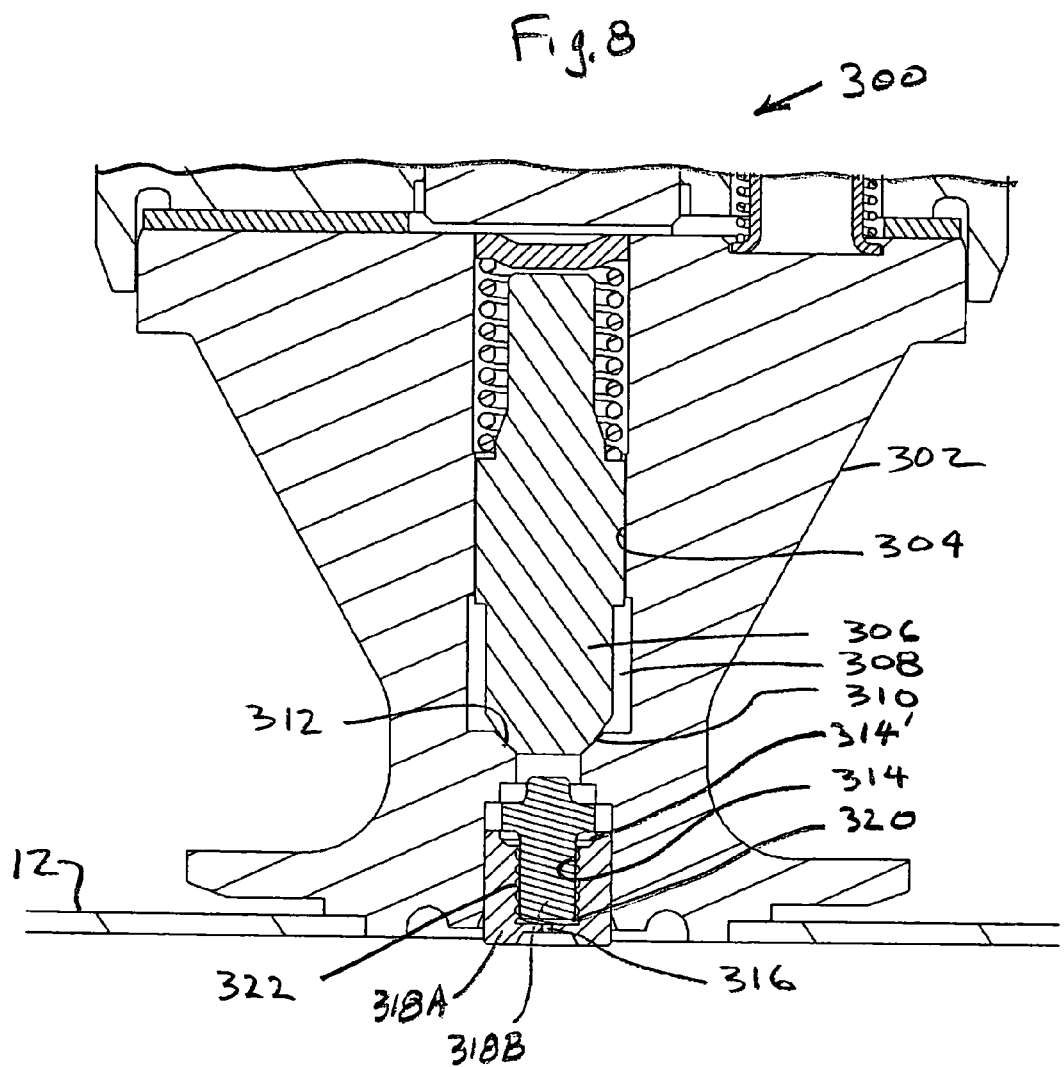
FIG. 8 is a sectional view of the nozzle region associated with FIG. 5.

FIG. 8 shows details of the nozzle region associated with FIG. 5, for an integrated pump injector 300 as mounted on an exhaust pipe 12. The body or housing 302 includes a central bore 304 with a needle valve 306 situated in the bore, having a moveable sealing face 310 selectively seated against a stationary sealing face 312. A pump or similar device provides pressurized treatment liquid to the source volume 308 immediately upstream of the seating surfaces 310, 312. A swirl chamber 314 is in selective fluid communication with the source volume 308, via the valve 306. As in the previous embodiments, a control system selectively moves the valve 306 into a closed condition whereby the moveable face 310 seals against the stationary face 312 and into an open condition whereby the moveable face lifts from the stationary face. In the present embodiment, the body 302 is counter bored at the lower end, such that the chamber 314 is defined within a swirl element 318A press fit or otherwise secured to the body. A plug 318B is fixed within the chamber 314, in this instance via an annular flange or shoulder pinned between the swirl element 318A and a counter shoulder in the counter bore of the body. Flow passages are provided either in the shoulder or through the plug 318B.

When the valve 306 opens, liquid under pressure in the volume 308 passes around or partially through the plug 318B where it enters the chamber 314, preferably via a tapered annular region 314'. The flow passes through the single or double helix flow channels 322 formed in this embodiment on the wall of chamber 314, while confined by the outer diameter of the cylindrical portion of plug 318B. As in the previously described embodiments, after passing through the flow channels, the liquid enters free space 320 where a whirl is formed before exiting through port 316.

In the three other embodiments 400, 500, and 600 shown in FIGS. 9-13, the common features include a body 402, 502, 602 and central bore 404, 504 and 604 with a valve and associated seat member 406, 506, and 606, for controlling flow from a source volume 408, 508, and 608 of pressurized fluid. Each has a plate or disc type valve, with a moveable disc valve member 410, 510; 610 and circular seat 412, 512, 612 fixed with respect to the body.

Figure 9:
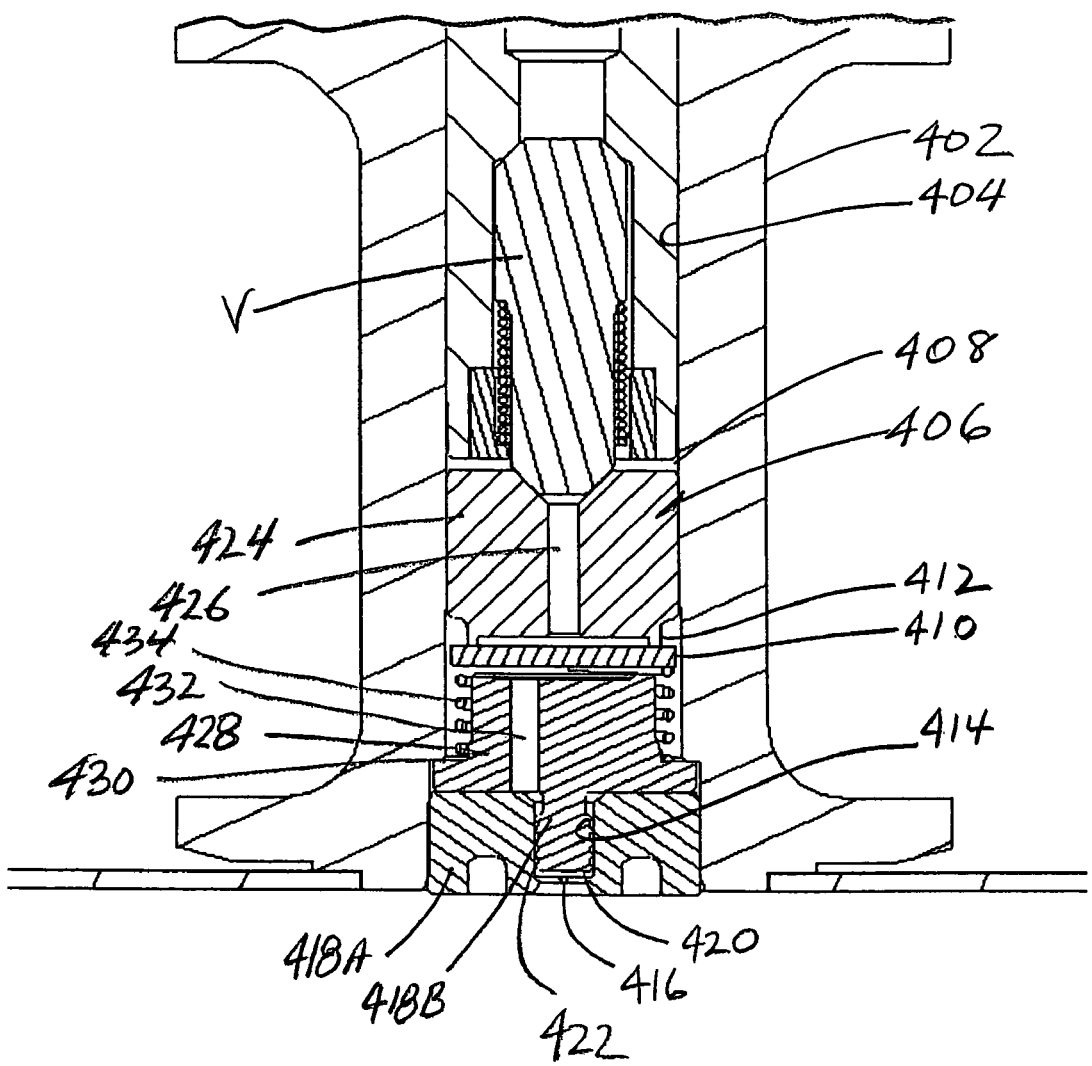
FIG. 9 is a sectional view similar to FIG. 8 of the nozzle region associated with FIG. 6.

With particular reference to the embodiment of FIG. 9, a fixed insert 418A defines the chamber 414, in this instance having a smooth cylindrical wall. The swirl flow channels 422 are formed as single or helical grooves on the exterior of the plug portion 418B in fixed position within the chamber. The discharge port 416 and free space 420 are provided as in the other embodiments.

The valve in this embodiment is formed in part by a valve insert 424 fixed with respect to the body 402 and having a central flow passage 426 from the pressurized source volume 408. The moveable valve portion 410 is associated with a spring seat insert 428 having a shoulder 430 which rests on the chamber insert 418A and which provides a seat for spring 434. The spring 434 biases the valve member 410 into the closed position against the seat 412. In this embodiment, when the valve opens, flow passes through passage 426, around the disc 410 into another flow passage 432 in the spring seat insert 428, to enter the transition annulus. All the flow passes the grooves 422 on the outer surface of the plug portion 418B. It can be seen that the plug portion 418B in this embodiment is an integral projection from the spring seat 428 into the swirl chamber 414.

FIGS. 10 and 11 show another embodiment in which the structures corresponding to the structures in FIG. 9 carry the same numeric identifier, but in a 500 series rather than a 400 series. In this embodiment, the swirl element 518A more closely resembles a cup with smooth cylindrical inner wall, and the plug portion 518B also has a smooth external cylindrical wall, providing a flow annulus whereby pressurized fluid can pass through the cutouts or notches 532 on the shoulder or flange 530 of the spring seat insert 528. In this embodiment, the flow channels 522 that produce the standing swirl in the space 520 are provided by formations at the bottom of the plug 518B in the form of peripheral notches 536 leading to slots 522 and a central substantially cylindrical region 520. Thus, in this embodiment, the fluid passageway as defined by the spring seat insert is an annulus around the spring seat insert. At least one slot 522 is required, but generally a plurality would be preferred.

In the embodiment of FIGS. 12 and 13, the overall components and functionality are similar to those of FIG. 10, except that the slots 622 and central space 620 are provided in a distinct disc 618' located at the flat bottom of the plug portion 618B. With the disc sitting on the flat bottom of the chamber insert 618A, trapped between the plug and the chamber bottom, the space 620 is defined by a cylindrical opening in the center of the disc leading to the port 616.

Optionally, the components associated with actuating the valves can include a needle type check valve V that seats against a conical transition on insert 424, 524, 624 to prevent leakage when the engine is turned off and which during operation is lifted off the seating surface to open flow into passage 426, 526, 626.

The preferred combination of features of these embodiments includes (1) a swirl element below the valve sealing face; (2) which element produces a helical flow confined in flow channels in a chamber; (3) upon exiting the flow channels the flow consolidates as a swirl in a free space; (4) the liquid leaves the free space through a narrow passage while maintaining a swirl; and (5) the fluid is discharged through the outlet of the passage or similar orifice as a whirling, atomized spray. The swirl element can be a combination of cooperating components and can be defined in part by the wall or floor of the chamber or plug within the chamber. Thus, "swirl element" should be understood a referring to a feature, not necessarily a distinct component.

The invention claimed is:

1. A system for after treatment of exhaust from a diesel engine, comprising:
   an exhaust pipe directing a flow of diesel exhaust;
   a device in the exhaust pipe for reducing pollutants in diesel exhaust as the exhaust passes through the device;
   a source of treatment liquid which when introduced into the exhaust enhances the reduction of pollutants as the exhaust passes under pressure through the device;
   an integrated pump injector mounted on the exhaust pipe upstream of the device, having a source inlet in fluid communication with the source of treatment liquid and a treatment outlet in fluid communication with the flow of exhaust;
   wherein said integrated pump injector includes
   a housing;
   a piston pump within the housing having a pumping chamber in fluid communication with the source inlet, where treatment liquid is charged from the source during an intake stroke of the piston and treatment liquid is pressurized and discharged during a pumping stroke of the piston;
   an injection nozzle within the housing having a nozzle inlet in fluid communication with the pumping chamber to receive the discharged treatment liquid and said treatment outlet in fluid communication with the flow of exhaust;
   a solenoid actuator within the housing that reciprocates the piston between the intake and pumping strokes at a pumping cycle frequency; and
   a controller operatively connected to the actuator, programmed for metering the quantity of treatment fluid injected into the flow of exhaust per unit time by changing the pumping frequency and wherein
   the source of liquid is a tank at ambient pressure;
   an unpressurized inlet line extends from the tank to the inlet;
   an inlet check valve is situated in the housing between the source inlet and the pumping chamber, permitting low pressure flow from the source inlet to the pumping chamber but preventing flow from the pumping chamber to the inlet line;
   an outlet check valve is situated in the housing between the pumping chamber and the injection nozzle inlet, permitting high pressure flow from the pumping chamber to the nozzle but preventing flow from the nozzle to the pumping chamber
   the outlet check valve includes a receiving volume in fluid communication with the injection nozzle inlet where pumped treatment liquid accumulates with increased pressure;
   the injector nozzle treatment outlet includes an orifice through which liquid reaching a threshold pressure in the receiving volume is delivered as an atomized spray into the exhaust flow;
   said injection nozzle further including
   a cylindrical swirl chamber in fluid communication with the outlet valve; a discharge port from the swirl chamber to a discharge orifice; a swirl element situated in the swirl chamber, while leaving a cylindrical free space immediately above the discharge port, the swirl element being fixed within the chamber, and having at least one flow channel leading to said space;

whereby when the valve is closed, no fluid can enter said swirl chamber and when the valve is open, pressurized fluid flows into said swirl chamber, through said swirl element into said space, forming a whirl in said space before passing through said discharge port and exiting said discharge orifice as an atomized whirling spray.

2. An integrated pump injector for mounting on an exhaust pipe, comprising a housing having an inlet;

a piston pump within the housing having a pumping chamber in fluid communication with the inlet, where treatment liquid is charged from a source during an intake stroke of the piston and treatment liquid is pressurized and discharged during a pumping stroke of the piston;

an injection nozzle within the housing having a nozzle inlet in fluid communication with the pumping chamber to receive the discharged treatment liquid and a nozzle outlet for fluid communication with the flow of exhaust;

an actuator in the housing that reciprocates the piston between the intake and pumping strokes at a pumping cycle frequency; and a controller operatively connected to the actuator, programmed for metering the quantity of treatment fluid injected into the flow of exhaust per unit time by changing the pumping frequency;

an outlet valve fluidly connected to the pumping chamber; wherein said injection nozzle includes a swirl chamber in fluid communication with the outlet valve;

a discharge port from the swirl chamber to a discharge orifice;

a swirl element situated in the swirl chamber, while leaving a cylindrical free space immediately above the discharge port;

the outlet valve is a check valve having a circular seat fixed with respect to the body and a movable disc valve member biased against said seat;

the swirl chamber has a cylindrical wall;

a cylindrical plug is fixed within the swirl chamber; and said swirl element includes helical flow channels provided in one of said wall or plug;

whereby when the valve is closed, no fluid can enter said swirl chamber and when the valve is open, pressurized fluid flows into said swirl chamber, through said swirl element into said space, forming a whirl in said space before passing through said discharge port and exiting said discharge orifice as an atomized whirling spray.

3. The integrated pump injector of claim 2, wherein, the circular seat is defined by a rim facing the chamber on a valve seat insert fixed with respect to the housing and having a flow passage in fluid communication with the pumping chamber;

a spring seat insert is fixed with respect to the housing, having a shoulder facing the disc and defining a fluid passageway to the swirl chamber; and a valve spring extending between said shoulder and said disc, thereby closing the valve until pressure in the flow passage of the valve seat exceeds a predetermined value, thereby opening the valve and delivering pressurized fluid through said fluid passageway to the swirl chamber.

4. The integrated pump injector of claim 3, wherein the plug is an integral projection of the spring seat insert into the swirl chamber.

5. The integrated pump injector of claim 3, wherein the fluid passageway defined by the spring seat insert is a bore through the spring seat insert.

6. The integrated pump injector of claim 3, wherein the fluid passageway defined by the spring seat insert is an annulus around the spring seat insert.

7. An integrated pump injector for mounting on an exhaust pipe, comprising:

a housing having an inlet;

a piston pump within the housing having a pumping chamber in fluid communication with the inlet, where treatment liquid is charged from a source during an intake stroke of the piston and treatment liquid is pressurized and discharged during a pumping stroke of the piston;

an injection nozzle within the housing having a nozzle inlet in fluid communication with the pumping chamber to receive the discharged treatment liquid and a nozzle outlet in fluid communication with the flow of exhaust;

an actuator that reciprocates the piston between the intake and pumping strokes at a pumping cycle frequency; and a controller operatively connected to the actuator, programmed for metering the quantity of treatment fluid injected into the flow of exhaust per unit time by changing the pumping frequency wherein;

an outlet valve is fluidly connected to the pumping chamber; and said injection nozzle includes a cylindrical swirl chamber in fluid communication with the outlet valve;

a discharge port from the swirl chamber to a discharge orifice;

a swirl element fixed within the swirl chamber, while leaving a cylindrical free space immediately above the discharge port and having at least one flow channel leading to said space;

whereby when the valve is closed, no fluid can enter said swirl chamber and when the valve is open, pressurized fluid flows into said swirl chamber, through said swirl element into said space, forming a whirl in said space before passing through said discharge port and exiting said discharge orifice as an atomized whirling spray.

8. The injector of claim 7, wherein the swirl element is a cylindrical plug and the at least one flow channel is either an external single groove or external plurality of helical grooves.

9. The injector of claim 7, wherein the swirl element is a cylindrical plug with upper and lower ends and the at least one flow channel is a plurality of slots at the lower end.

10. The injector of claim 7, wherein the swirl element comprises a cylindrical plug with upper and lower ends and a flat disc at the lower end of the plug, said at least one flow channel provided as a plurality of slots in said disc.

11. The injector of claim 7, wherein the swirl element is a cylindrical plug with upper and lower ends and the at least one flow channel is a plurality of bores through the plug.

12. The injector of claim 7, wherein said swirl element has upper and lower ends, the chamber has a bottom, and said space is situated between the lower end of the swirl element and the bottom of the chamber.

13. The injector of claim 7, wherein the swirl chamber has a bottom, said disc is trapped between the plug and the chamber bottom, and said space is defined by a cylindrical opening in the center of the disc.

* * * * *